(12) United States Patent
Klurfeld et al.

(10) Patent No.: US 11,015,689 B2
(45) Date of Patent: May 25, 2021

(54) MULTI-SPEED ELECTRIC MACHINE GEARBOX WITH LOW DRIVE RATIO

(71) Applicant: Ford Global Technologies, LLC, Dearborn, MI (US)

(72) Inventors: Steven Isaac Klurfeld, Dearborn, MI (US); Steven Anatole Frait, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 16/278,518

(22) Filed: Feb. 18, 2019

(65) Prior Publication Data

US 2020/0263770 A1    Aug. 20, 2020

(51) Int. Cl.
| | |
|---|---|
| *F16D 11/00* | (2006.01) |
| *F16H 37/08* | (2006.01) |
| *F16H 3/54* | (2006.01) |
| *F16H 48/08* | (2006.01) |
| *F16D 11/14* | (2006.01) |
| *F16H 63/30* | (2006.01) |

(52) U.S. Cl.
CPC .......... *F16H 37/082* (2013.01); *F16D 11/14* (2013.01); *F16H 3/54* (2013.01); *F16H 48/08* (2013.01); *F16H 63/30* (2013.01); *F16D 2011/002* (2013.01); *F16H 2063/3096* (2013.01)

(58) Field of Classification Search
CPC .......... F16H 37/082; F16H 3/54; F16H 48/08; F16H 63/30; F16H 2063/3096; F16D 11/14; F16D 2011/002
See application file for complete search history.

(56) References Cited

U.S. PATENT DOCUMENTS

| | | | |
|---|---|---|---|
| 9,453,564 B1* | 9/2016 | Pritchard | B60K 1/00 |
| 10,604,009 B2* | 3/2020 | Yang | B60K 23/0808 |
| 2010/0267508 A1 | 10/2010 | Hvolka et al. | |
| 2016/0245382 A1* | 8/2016 | Hemphill | F16H 3/14 |

FOREIGN PATENT DOCUMENTS

| | | |
|---|---|---|
| CN | 208311392 U | 1/2019 |
| KR | 101408465 B1 | 6/2014 |

OTHER PUBLICATIONS

Stumpf, Electric Cars Are About to Get a Lot Faster and Go a Lot Further on a Charge, Article, Nov. 29, 2017, 6 pages.
Lambert, Kreisel unveils an automated 2-speed transmission for electric cars, Article, Sep. 6, 2018, 3 pages.

* cited by examiner

*Primary Examiner* — David J Hlavka
(74) *Attorney, Agent, or Firm* — David B Kelley; Brooks Kushman P.C.

(57) ABSTRACT

A gearbox includes an input gear supported for rotation about an input axis and includes first and second idler gears fixedly coupled to each other and supported for rotation about a transfer axis. The first idler gear is fixedly coupled to the input gear. A planetary gear set is supported for rotation about an output axis of the gearbox and has a first component fixedly coupled to the second idler gear. A differential is supported for rotation about the output axis, co-axial with the planetary gear set, and fixedly coupled to a second component of the planetary gear set.

20 Claims, 3 Drawing Sheets

MULTI-SPEED ELECTRIC MACHINE GEARBOX WITH LOW DRIVE RATIO

TECHNICAL FIELD

This disclosure relates to the field of gearboxes for motor vehicles. More particularly, the disclosure pertains to multi-speed gearboxes for use with electric machines to provide LOW range and HIGH range speed ratios.

BACKGROUND

Many vehicles are used over a wide range of vehicle speeds, including both forward and reverse movement. Engine powered vehicles, however, require multi-speed transmissions to operate the engine within a narrow range of optimum speeds. When the vehicle is at low speed, the transmission is usually operated at a low speed ratio such that it multiplies the engine torque for improved acceleration. At high vehicle speed, operating the transmission at a high speed ratio permits an engine speed associated with quiet, fuel efficient cruising. Typically, an automatic transmission has a housing mounted to the vehicle structure, an input shaft driven by an engine crankshaft, and an output shaft driving the vehicle wheels, often via a differential assembly which permits the left and right wheels to rotate at slightly different speeds as the vehicle turns.

Fully electric vehicles, on the other hand, typically do not include multi-speed gearboxes as electric machines have a larger optimal speed range. A typically fully electric vehicle may include a single-speed gearbox.

SUMMARY

According to one embodiment, a gearbox includes an input gear supported for rotation about an input axis and includes first and second idler gears fixedly coupled to each other and supported for rotation about a transfer axis. The first idler gear is fixedly coupled to the input gear. A planetary gear set is supported for rotation about an output axis of the gearbox and has a first component fixedly coupled to the second idler gear. A differential is supported for rotation about the output axis, co-axial with the planetary gear set, and fixedly coupled to a second component of the planetary gear set.

According to other aspects of the embodiment, the gearbox may further include a clutch configured to selectively hold a third component of the planetary gear set against rotation to selectively constrain the second component to rotate at a first speed proportional to a speed of the first component. The clutch may be a dog clutch. The clutch may further be configured to selectively couple the second component to the third component to selectively constrain the second component to rotate at a second speed that is equal to a speed of the first component. The second speed may be greater than (faster than) the first speed.

According to yet another aspect of the embodiment, the first component may be a ring gear and the second component may be a planet carrier, and the planetary gear set further includes a sun gear and at least one planet gear supported for rotation on the planet carrier and in continuous meshing engagement with the sun gear and the ring gear. The gear box may include a shift element configured to selectively couple the sun gear to the planet carrier to constrain the planet carrier to rotate at a first speed proportional to a speed of the input gear and to selectively hold the sun gear against rotation to constrain the planet carrier to rotate at a second speed proportional to the speed of the input gear. The first speed may be greater than the second speed. The shift element may be a dog clutch.

The planet carrier may define first teeth and a gearbox housing may have a rotationally fixed annular body defining second teeth. A clutch may include a shift sleeve fixedly coupled to the sun gear and having a first locking annulus defining third teeth and a second locking annulus defining fourth teeth. The shift sleeve may be axially movable to a first position in which the first teeth mesh with the third teeth to selectively couple the sun gear to the planet carrier and to a second position in which the second teeth mesh with the fourth teeth to hold the sun gear against rotation. The shift sleeve may be configured to constrain the planet carrier to rotate at a first speed proportional to a speed of the input gear when in the first position and to constrain the planet carrier to rotate at a second speed proportional to the speed of the input gear when in the second position. The first speed may be greater than the second speed. The shift sleeve may be splined to the sun gear.

The gearbox may be designed for use with an electric machine. The input axis, the transfer axis, and the output axis may not be co-axial. The input gear may be supported on a motor shaft. The input gear may be in continuous meshing engagement with the first idler gear, and the first component may be in continuous meshing engagement with the second idler gear.

According to another embodiment, a powertrain includes a gearbox having an input shaft, a layshaft, a differential supported for rotation about an output axis, a gearing arrangement supported for rotation about the output axis and fixedly coupled to the layshaft and the differential, and a shift element associated with the gearing arrangement. The shift element includes first and second position. When in the first position, the shift element engages with the gearing arrangement to impose a first speed relationship among the differential and the layshaft and, when in a second position, the shift element engages with the gearing arrangement to impose a second speed relationship among the differential and the layshaft.

According to yet another embodiment, a powertrain includes an electric machine, an input gear coupled to the electric machine, and a layshaft supporting a first idler gear fixedly coupled to the input gear and a second idler gear fixedly coupled to the first idler gear. The input gear and the first idler gear cooperate to impose a first fixed speed relationship among the electric machine and the layshaft. A planetary gear set includes a ring gear fixedly coupled to the second idler gear, a sun gear, a planet carrier, and at least one planet gear supported for rotation on the planet carrier and in continuous meshing engagement with the sun gear and the ring gear. The second idler gear and the ring gear cooperate to impose a second fixed speed relationship among the layshaft and the ring gear. A differential is fixedly coupled to the planet carrier. A clutch is configured to selectively couple the sun gear to the planet carrier to impose a first selective speed relationship among the electric machine and the planet carrier when in a first position and to selectively hold the sun gear against rotation to impose a second selective speed relationship among the electric machine and the planet carrier that is less than (i.e., slower than) the first selective speed relationship when in a second position.

DETAILED DESCRIPTION

Figure 1:
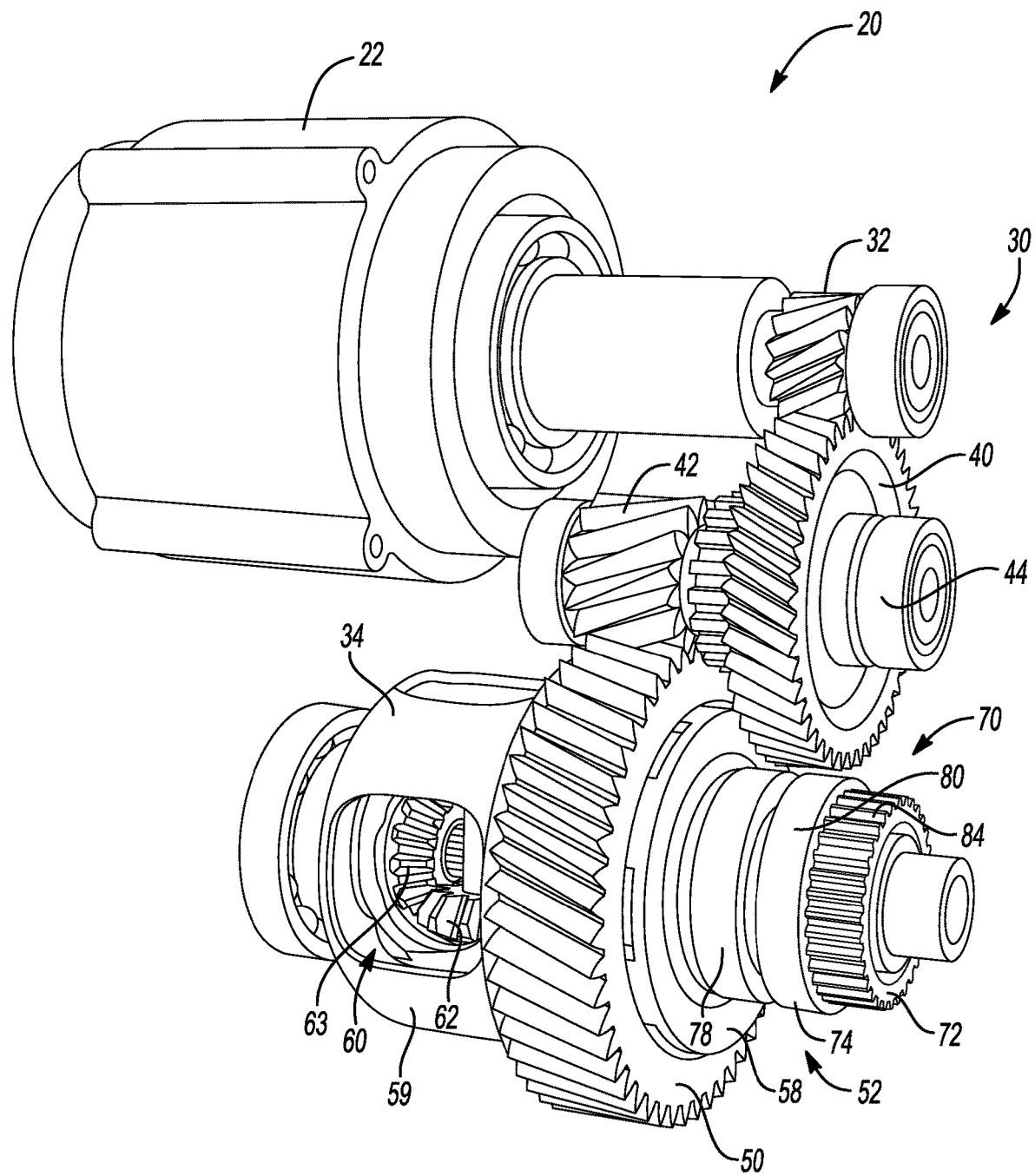
FIG. 1 is a partial perspective view an electric powertrain.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and sometimes shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction. A discrete ratio transmission has a gearing arrangement that selectively imposes a variety of speed ratios between an input shaft and an output shaft.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. Two elements are coupled if they are either fixedly coupled or selectively coupled.

A shift element that holds a rotating element against rotation by selectively connecting it to the housing is commonly called a brake. A shift element that selectively couples two or more rotating elements to one another is commonly called a clutch. For the purposes of this application, the term "clutch" encompasses both clutches and brakes. Shift elements may be actively controlled devices such as hydraulically or electrically actuated clutches or brakes or may be passive devices such as one-way clutches or brakes.

An electrified vehicle may have an all-electric powertrain including, as major components, at least one electric machine, a gearbox, and a differential. An example fully electric vehicle may include one or more of these all electric powertrains at the front axle, the rear axle, or both. An example hybrid electric vehicle may include a traditional powertrain powering the front axle or the rear axle and an all-electric powertrain powering the other of the front axle or the rear axle.

Typical all-electric powertrains include a single-speed gearbox. The gearbox includes an input shaft that receives power from the electric machine, an output shaft operably coupled to driven wheels (such as by a differential and axle shafts), and one or more intermediate components configured to reduce the speed ratio between the output shaft and the input shaft. Speed ratios expressed herein refer to the speed of the input relative to the output, e.g., a 4:1 speed ratio means the input rotates four times for every one rotation of the output. Used herein, "low" or "lower" refers to greater speed reduction at the output, e.g., a speed ratio of 20:1 is lower than a speed ratio of 10:1.

As introduced above, most fully electrified vehicles designed primarily for on-road use require only a single-speed gearbox. A typical single-speed gearbox has around 8:1 to 10:1 speed reduction. This reduction, in conjunction with a properly sized electric machine, is able to produce sufficient wheel torque to propel the vehicle for on-road use, but may be insufficient for off-road use. Many passenger vehicles, such as pickup trucks and sport utility vehicles are designed for both on and off road uses, and electrified versions thereof may benefit from having a multi-speed gearbox that provides at least one lower gear ratio configured to improve off-road performance.

Conventionally powered pickup trucks and sport utility vehicles commonly include four-wheel-drive transfer cases having both a high (4 HIGH) and a low (4 LOW) range. While the inherent characteristics of electric machines reduces the need for transmissions having several discrete gear ratios, providing an electric machine gearbox with a 4 LOW equivalent may provide several advantages including increased wheel torque for a similarly sized electric motor, more precise vehicle speed control, and a less-compromised primary speed ratio for on-road use.

Figure 2:
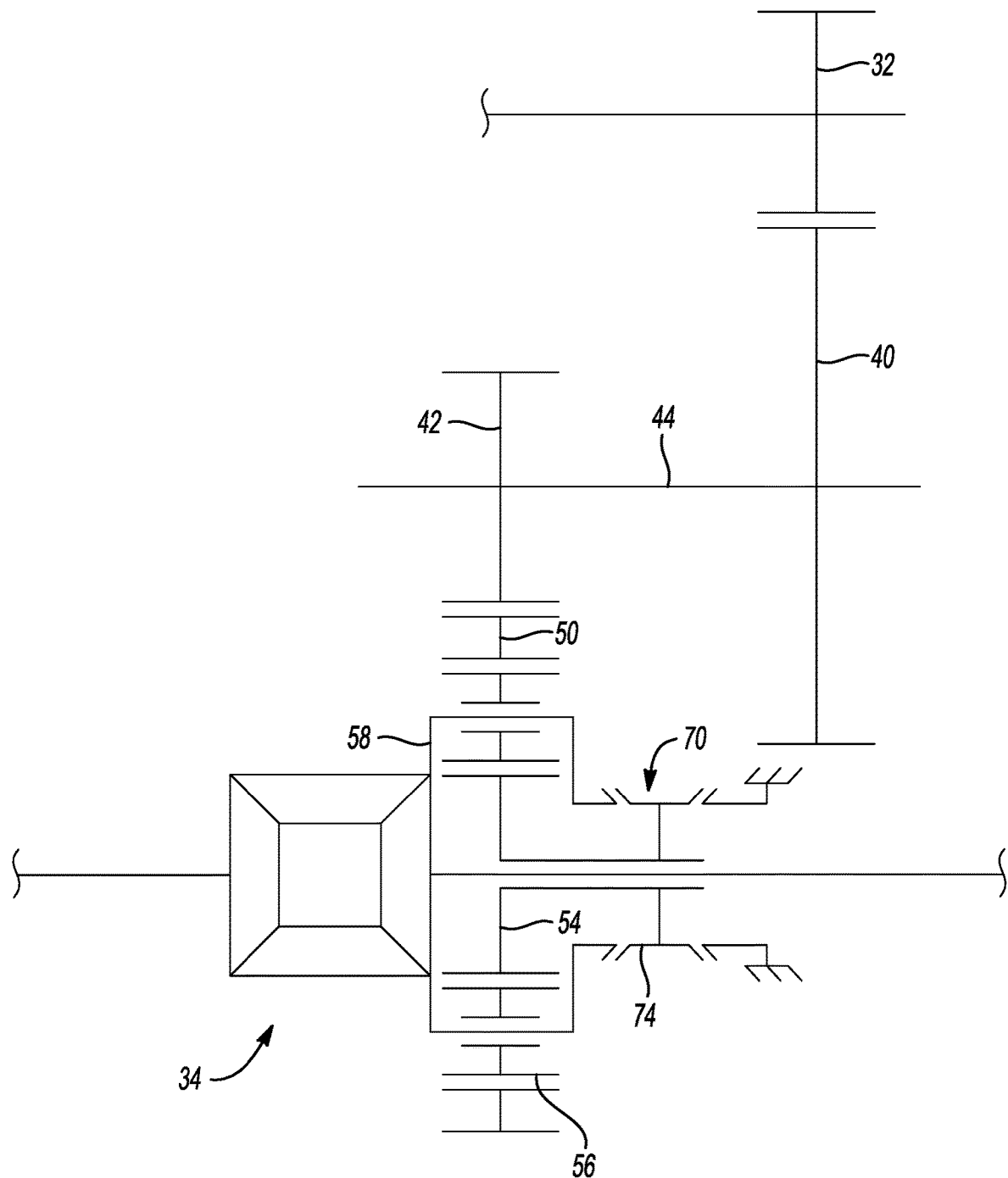
FIG. 2 is a stick diagram of a gearbox of the electric powertrain.
Figure 3:
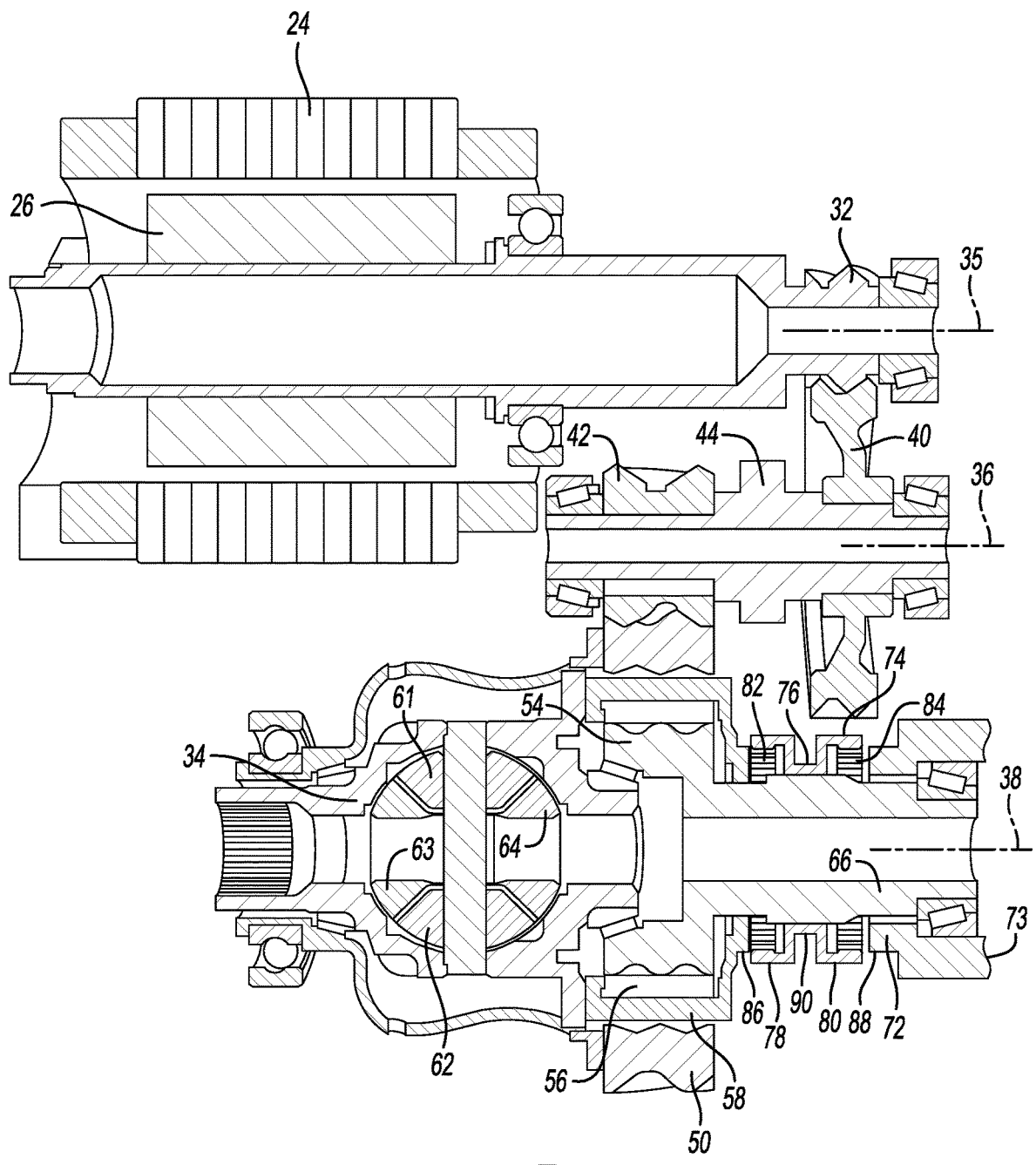
FIG. 3 is a cross-sectional view of the electric powertrain.

Referring to FIGS. 1 through 3, an electrified powertrain 20 may include at least one electric machine (motor) 22, a gearbox 30, and a differential 34. In some embodiments, the differential may be part of the gearbox as shown in FIG. 1. The electrified powertrain 20 may be packaged as an electrified axle (e-axle). The motor 22 may be capable of acting as a motor and as a generator. The motor 22 includes a stator 24 and a rotor 26. The rotor 26 is supported for rotation within the stator 24 by a shaft 28. The shaft 28 may be referred to as an output shaft of the electric motor 22 and may be referred to as an input shaft of the gearbox 30. In the illustrated embodiment, the motor shaft and the input shaft are a shared shaft 28, but in other embodiments, the motor shaft and input shaft may be separate components that are coupled to each other. The electric motor 22, the gearbox 30, and the differential 34 may be packaged as a single assembly disposed within a common housing (not shown). This assembly may be referred to as a transmission.

The gearbox 30 is a multi-speed gearbox, such as the illustrated two-speed gearbox that includes a HIGH range primarily designed for on-road use and a LOW range primarily designed for off-road use. For example, the HIGH range may have a speed ratio between 8:1 to 12:1, and the LOW range may have a speed ratio between 14:1 to 23:1.

The gearbox 30 may include three axes: a motor axis (input axis) 34 that extends through a center line of the shaft 28, a transfer axis 36, and an output axis 38. The three-axes design allows the gearbox 30 to be axially compact. The three axes 34, 36, 38 may not be co-axial and may be parallel to each other. The gearbox 30 may have a first fixed speed reduction between the motor axis 34 and the transfer axis 36. The output axis 38 receives power at a second fixed speed reduction and may include a gearing arrangement, e.g., a planetary gear set, configured to further change the speed ratio and configured to not modify the second speed reduction. The gearing arrangement may be shiftable between HIGH range, a LOW range, and Neutral. In HIGH range the gearing arrangement may be in direct drive (1:1) so that the speed ratio is not further reduced, and in LOW range the gearing arrangement may further reduce the speed ratio to increase wheel torque.

In one embodiment, an input gear 32 of the gearbox 30 is fixedly coupled on the shaft 28 so that the input gear 32 rotates in unison with the rotor 26, e.g., the input gear 32 rotates at motor speed. The input gear 32 is supported for rotation about the input axis 34. The transfer axis 36 may include a first idler gear 40 in meshing engagement with the input gear 32 and a second idler gear 42. The first gear 40 and the second gear 42 are rotationally fixed to a layshaft 44 to rotate in unison and thus are fixedly coupled to each other. The transfer axis 36 may be an axial centerline of the layshaft 44. The input gear 32 has a smaller diameter and less teeth than the first gear 40 to create a speed reduction of between 2 to 4. In the illustrated embodiment there is a 3.14:1 speed ratio between the input gear 32 and the first gear 40.

The output axis 38 may include an input gear 50, the differential 34 as an output, and a gearing arrangement 52 disposed therebetween. The input gear 50, the gearing arrangement 52, and the differential 34 are supported for rotation about the output axis 38 and are co-axial relative to each other. The input gear 50 may be a component of the gearing arrangement 52. The gearing arrangement 52 may be a planetary gear set, such as the illustrated simple planetary gear set. The planetary gear set 52 includes components such as a ring gear, which is the input gear 50, a sun gear 54, a plurality of planet gears 56, and a planet carrier 58. The sun gear 54 rotates about the output axis 38. The planet carrier 58 rotates about the output axis 38 and supports the set of planet gears 56 such that the planet gears rotate with respect to the planet carrier and orbit around the output axis 38. External gear teeth on the planet gears 56 mesh with external gear teeth on the sun gear 54 and with internal gear teeth on the ring gear 50.

The simple planetary gear set 52 is one type of gearing arrangement that imposes a fixed linear speed relationship among the sun gear, the planet carrier, and the ring gear. Other known types of gearing arrangements also impose a fixed linear speed relationship among three rotating elements. For example, a double-pinion planetary gear set imposes a fixed linear speed relationship between the sun gear, the ring gear, and the planet carrier. An example ratio of gear teeth between the ring gear 50 and the sun gear 54 is 1.44. Of course, other ratios can be used in other embodiments.

Planet carrier 58 may be the output of the planetary gear set 52 and be fixedly coupled to the differential 34. The differential 34 may include a case 59 that supports a differential mechanism 60 configured to convey power between the planet carrier 58 and driven wheels. The case 59 may be directly attached to the planet carrier 58, such as by fasteners, or, in some embodiments, the planet carrier may be integrally formed with the case. The differential mechanism 60 may include a pair of opposing spider gears 61, 62 that rotate about the axis 38 with the case 59 and a pair of opposing first and second side gears 63, 64 that are in meshing engagement with the spider gears 61, 62. The side gears 63, 64 may include splines for connecting to axle shafts that supply the power to driven wheels of the vehicle. The differential 34 may be an open or limited-slip differential and may include a locker. Many types of differentials are known; this application is not limited to any particular design.

The sun gear 54 includes a shaft portion 66 supported for rotation about the output axis 38. The sun gear 54 and the shaft portion 66 may be integrally formed as a single piece (as illustrated) or may be two separate pieces fixedly coupled. e.g., welded, to rotate together. The sun gear 54 may be co-axial with the differential 34 such that the side gears 63 and 64 are also supported for rotation about the output axis 38. The ring gear 50 includes external teeth that mesh with teeth of the second gear 42 to transfer power from the transfer axis 36 to the output axis 38. The ring gear 50 has a larger diameter and more teeth than the second gear 42 to create a speed reduction of between 2 to 4. In the illustrated embodiment, there is a 3.57:1 speed ratio between the second gear 42 and the ring gear 50.

The gearbox 30 may include one or more shift elements for operating the planetary gear set 52 to shift between LOW range, HIGH range, and NEUTRAL (in NEUTRAL the power flow path between the ring gear 50 and the differential 34 is severed so that the driven wheels can rotate independent of the motor 22). The shift element is configured to hold one of the planetary components of the gear set 52, e.g., the sun gear 54, to create an output rotation that is reduced in speed relative to an input rotation. The shift element may also be configured ground two of the planetary components to each other to tie up the gear set 52 creating 1:1 speed ratio (direct drive) between the input and output components (e.g., ring gear 50 and planet carrier 58). The gearbox 30 may be placed in LOW by commanding the shift element to hold one of the planetary components and be placed in HIGH by grounding two planetary components to each other. The speed ratio between the planet carrier 58 and the ring gear 50 when in HIGH range is consider greater than (faster than) the speed ratio between the planet carrier 58 and the ring gear 50 when in LOW range.

The at least one shift element may be a single clutch 70 that is actuatable to ground the sun gear 54 to a boss 72 of a gearbox housing 73 to achieve LOW, rotationally lock the sun gear 54 to the planet carrier 58 to achieve HIGH, and release the sun gear 54 to achieve NEUTRAL. The boss 72 and the housing 73 may be integrally formed or separate, attached components. The clutch 70 may be a dog clutch that is concentric with the shaft 66 and supported by the shaft for rotation about the output axis 38. The clutch 70 includes a shift sleeve 74 having a hub 76 seated on the shaft 66. An inner circumferential surface of the hub 76 may define internal splines that mate with external splines formed on the shaft 66 so that the sleeve 74 is rotationally fixed to the shaft 66 while being axially slidable relative to the shaft 66. The sleeve 74 also includes opposing first and second locking annuli 78, 80 configured to engage with the planet carrier 58 and the boss 72, respectively. The locking annuli 78, 80 have circumferential surfaces defining teeth 82, 84. The teeth 82 are configured to engage with dog teeth 86 formed on the planet carrier 58 to selectively couple the sun gear 54 and the planet carrier 58. The teeth 84 are configured to engage with dog teeth 88 formed on the boss 72 to ground the sun gear 54 to the gearbox housing 73. The dog clutch 70 may include synchronizers (not shown) to facilitate engagement of the shift sleeve 74 with the planet carrier 58 and the boss 72. The inclusion of synchronizers is optional.

FIG. 3 shows the shift sleeve 74 being in a middle position in which the locking annuli 78, 80 are disengaged with the carrier 58 and the boss 72, which corresponds with the gearbox 30 being in NEUTRAL. The gearbox 30 may be shifted to LOW by sliding the shift sleeve 74 towards the boss 72 (e.g. slide right) to ground the sun gear 54 to the housing. With the sun gear 54 grounded, power at the ring gear 50 is output to the planet carrier 58 at a reduced speed ratio. The gearbox 30 may be shifted to HIGH by sliding the shift sleeve 74 towards the planet carrier 58 (e.g. slide left) to selectively couple the sun gear 54 and the planet carrier 58. Selectively coupling the sun gear 54 and the planet carrier 58 locks-up the planetary gear set 52 causing the ring gear 50 and the planet carrier 58 to rotate at the same speed, e.g. direct drive.

The shift sleeve 74 may be operated by a shift fork (not shown) that engages with the groove 90. The shift forks may be manually operated by the driver via a shift lever disposed in the vehicle cabin. Alternatively, the shift fork may be electromechanically controlled, e.g., an electric motor, according to driver request. The cabin may include an input such as a button, knob, toggle, or capacitive touch that allows the driver to select between HIGH, LOW, and NEUTRAL. The electric powertrain 20 may include an associated vehicle controller, e.g., powertrain control module, programmed to automatically shift the gearbox between HIGH and LOW, or at least shift the gearbox 30 from LOW to HIGH when certain operating conditions are present. For example, the controller may be programmed to shift the gearbox 30 from LOW to HIGH in response to vehicle speed exceeding a threshold, motor speed exceeding a threshold, or other sensed conditions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A powertrain comprising:
    a gearbox including:
        an input shaft including an input gear,
        a layshaft including first and second idler gears fixedly coupled to each other, the first idler gear being fixedly coupled to the input gear,
        a differential supported for rotation about an output axis,
        a gearing arrangement supported for rotation about the output axis and fixedly coupled to the second idler gear of the layshaft and the differential, and
        a shift element associated with the gearing arrangement, wherein the shift element, when in a first position, engages with the gearing arrangement to impose a first speed relationship among the differential and the layshaft and, when in a second position, engages with the gearing arrangement to impose a second speed relationship among the differential and the layshaft.

2. The powertrain of claim 1 further comprising an electric machine, wherein the input shaft is driven by the electric machine.

3. The powertrain of claim 1, wherein the gearing arrangement is a planetary gear set having a first component fixedly coupled to the second idler gear and a second component fixedly coupled to the differential.

4. The powertrain of claim 3 further comprising a clutch configured to selectively hold a third component of the planetary gear set against rotation to selectively constrain the second component to rotate at a first speed proportional to a speed of the first component.

5. The powertrain of claim 4, wherein the clutch is further configured to selectively couple the second component to the third component to selectively constrain the second component to rotate at a second speed that is equal to a speed of the first component, wherein the second speed is faster than the first speed.

6. The powertrain of claim 3, wherein the first component is a ring gear and the second component is a planet carrier, and the planetary gear set further includes a sun gear and at least one planet gear supported for rotation on the planet carrier and in continuous meshing engagement with the sun gear and the ring gear.

7. The powertrain of claim 6 further comprising a shift element configured to selectively couple the sun gear to the planet carrier to constrain the planet carrier to rotate at a first speed proportional to a speed of the input gear and to selectively hold the sun gear against rotation to constrain the planet carrier to rotate at a second speed proportional to the speed of the input gear, wherein the first speed is greater than the second speed.

8. The powertrain of claim 6, wherein the planet carrier defines first teeth, and further comprising:
    a rotationally fixed annular body defining second teeth; and
    a clutch including a shift sleeve fixedly coupled to the sun gear and having a first locking annulus defining third teeth and a second locking annulus defining fourth teeth, wherein the shift sleeve is axially movable to a first position in which the first teeth mesh with the third teeth to selectively couple the sun gear to the planet carrier and to a second position in which the second teeth mesh with the fourth teeth to hold the sun gear against rotation, wherein the shift sleeve is configured to constrain the planet carrier to rotate at a first speed proportional to a speed of the input gear when in the first position and to constrain the planet carrier to rotate at a second speed proportional to the speed of the input gear when in the second position, and wherein the first speed is greater than the second speed.

9. The powertrain of claim 8, wherein the shift sleeve is splined to the sun gear.

10. The powertrain of claim 1, wherein the input shaft, the layshaft, and the output axis are not co-axial.

11. The powertrain of claim 1, wherein the input gear is in continuous meshing engagement with the first idler gear, and a component of the gearing arrangement is in continuous meshing engagement with the second idler gear.

12. The powertrain of claim 1, wherein the input gear is supported on a motor shaft.

13. The powertrain of claim 1, wherein the gearing arrangement is a simple planetary gear set including a sun gear, a ring gear fixedly coupled to the layshaft, a planet carrier fixedly coupled to the differential, and at least one planet gear supported for rotation on the planet carrier and in continuous meshing engagement with the sun gear and the ring gear, wherein the shift element holds the sun gear against rotation when in the first position, and the shift element selectively couples the sun gear to the planet carrier when in the second position.

14. A powertrain comprising:
 a gearbox including:
  an input shaft,
  a layshaft,
  a differential supported for rotation about an output axis,
  a gearing arrangement supported for rotation about the output axis and fixedly coupled to the layshaft and the differential, wherein the gearing arrangement is a simple planetary gear set including a sun gear, a ring gear fixedly coupled to the layshaft, a planet carrier fixedly coupled to the differential, and at least one planet gear supported for rotation on the planet carrier and in continuous meshing engagement with the sun gear and the ring gear, and
  a shift element associated with the gearing arrangement, wherein the shift element, when in a first position, engages with the gearing arrangement to impose a first speed relationship among the differential and the layshaft and, when in a second position, engages with the gearing arrangement to impose a second speed relationship among the differential and the layshaft, wherein the shift element holds the sun gear against rotation when in the first position, and the shift element selectively couples the sun gear to the planet carrier when in the second position.

15. The powertrain of claim 14, wherein the shift element is a dog clutch that is supported for rotation about the output axis.

16. The powertrain of claim 15, wherein the sun gear includes a shaft portion supported for rotation about the output axis, and the dog clutch includes a shift sleeve that is fixedly coupled to the shaft portion and axially movable relative to the shaft portion.

17. A powertrain comprising:
 an electric machine;
 an input gear coupled to the electric machine;
 a layshaft supporting a first idler gear fixedly coupled to the input gear and a second idler gear fixedly coupled to the first idler gear, wherein the input gear and the first idler gear cooperate to impose a first fixed speed relationship among the electric machine and the layshaft;
 a planetary gear set including a ring gear fixedly coupled to the second idler gear, a sun gear, a planet carrier, and at least one planet gear supported for rotation on the planet carrier and in continuous meshing engagement with the sun gear and the ring gear, wherein the second idler gear and the ring gear cooperate to impose a second fixed speed relationship among the layshaft and the ring gear;
 a differential fixedly coupled to the planet carrier; and
 a clutch configured to selectively couple the sun gear to the planet carrier to impose a first selective speed relationship among the electric machine and the planet carrier when in a first position and to selectively hold the sun gear against rotation to impose a second selective speed relationship among the electric machine and the planet carrier that is less than the first selective speed relationship when in a second position.

18. The electric powertrain of claim 17, wherein the first idler gear is in continuous meshing engagement with the input gear, and the ring gear is in continuous meshing engagement with the second idler gear.

19. The electric powertrain of claim 17, wherein the clutch is a dog clutch.

20. The electric powertrain of claim 19 further comprising a housing, wherein the dog clutch includes a shift sleeve that is fixedly coupled to the sun gear and axially movable relative to the sun gear, the shift sleeve having a first locking annulus defining first teeth and a second locking annulus defining second teeth, wherein the shift sleeve is axially movable to mesh the first teeth with third teeth defined by the planet carrier to place the clutch in the first position, and the shift sleeve is axially movable to mesh the second teeth with fourth teeth, that are rotationally fixed to the housing, to place the clutch in the second position.

* * * * *